United States Patent
Andrejco et al.

(10) Patent No.: US 8,123,400 B2
(45) Date of Patent: Feb. 28, 2012

(54) MULTI-CORE FIBER GRATING SENSOR

(75) Inventors: Matthew J Andrejco, Clinton, NJ (US); Gregory M Bubel, Middletown, NJ (US); David J Kudelko, Rockaway, NJ (US); Yaowen Li, Princeton, NJ (US); Man F Yan, Berkeley Heights, NJ (US)

(73) Assignee: OFS Fitel, LLC, Norcross, GA (US)

( * ) Notice: Subject to any disclaimer, the term of this patent is extended or adjusted under 35 U.S.C. 154(b) by 497 days.

(21) Appl. No.: 12/372,495

(22) Filed: Feb. 17, 2009

(65) Prior Publication Data

US 2009/0262779 A1    Oct. 22, 2009

Related U.S. Application Data

(60) Provisional application No. 61/045,315, filed on Apr. 16, 2008.

(51) Int. Cl.
    *G01D 5/353*       (2006.01)
    *G01K 11/32*      (2006.01)

(52) U.S. Cl. .................. 374/131; 374/E11.016; 385/12; 385/126

(58) Field of Classification Search .................. 374/130, 374/131, E11.015, E11.016; 385/12, 13, 385/37, 126
See application file for complete search history.

(56) References Cited

U.S. PATENT DOCUMENTS

| | | | |
|---|---|---|---|
| 5,500,031 A | 3/1996 | Atkins et al. | |
| 5,563,967 A | 10/1996 | Haake | |
| 6,024,488 A * | 2/2000 | Wu et al. | 374/161 |
| 6,334,018 B1 | 12/2001 | Fokine | |
| 6,833,541 B2 | 12/2004 | Shu et al. | |
| 6,853,792 B2 * | 2/2005 | Logvin et al. | 385/129 |
| 6,865,194 B1 | 3/2005 | Wright et al. | |
| 7,027,699 B2 * | 4/2006 | Tao et al. | 385/126 |
| 7,324,714 B1 * | 1/2008 | Cranch et al. | 385/12 |
| 7,373,062 B2 * | 5/2008 | Huber | 385/125 |
| 7,379,631 B2 * | 5/2008 | Poland et al. | 385/12 |
| 7,421,905 B2 * | 9/2008 | Zerwekh et al. | 73/800 |
| 7,512,292 B2 * | 3/2009 | MacDougall et al. | 385/12 |
| 2005/0118064 A1 * | 6/2005 | Berg | 422/91 |

OTHER PUBLICATIONS

M.G. Xu, J.L. Archambault, L. Reekie and J.P. Dakin, Discrimination between strain and temperature effects using dual-wavelength fibre grating sensors, Electronics Letters, Jun. 23, 1994, vol. 30, No. 13, pp. 1085-1087.

P.M. Cavaleiro, F.M. Ara'Ujo, L.A. Ferreira, J.L. Santos, and F. Farahi, "Simultaneous Measurement of Strain and Temperature Using Bragg Gratings Written in Germanosilicate and Boron-Codoped Germanosilicate Fibers", IEEE Photonics Technology Letters, vol. 11, No. 12, Dec. 1999.

* cited by examiner

*Primary Examiner* — R. A. Smith

(57) ABSTRACT

A twin core fiber for sensor applications is developed. It is particularly useful in de-coupling the strain and temperature and thus obtaining both measurement parameters at the same time and location. It is also particularly useful for measuring the temperature in a high humidity environment. The twin core fiber has two cores and each of the cores having a different dopant regime. Also, each of the cores includes a grating having substantially the same grating period.

20 Claims, 8 Drawing Sheets

MULTI-CORE FIBER GRATING SENSOR

CROSS APPLICATION TO RELATED APPLICATIONS

This application claims the benefit of U.S. provisional patent application Ser. No. 61/045,315, filed Apr. 16, 2008, having the title "Twin-Core Fiber Grating Sensor," which is incorporated herein by reference in its entirety.

TECHNICAL FIELD

The present invention relates to optical fibers, and more particularly to fiber grating sensors.

BACKGROUND OF THE INVENTION

Multiplexing capability, small footprint and measurement robustness have made fiber Bragg grating based sensors very attractive to many measurement applications. In fiber Bragg grating-based sensors, parameters to be sensed are applied to the gratings either directly or indirectly through some arrangements. In most cases, change in the Bragg grating wavelength is the measurement, which correlates to the sensing parameters.

To measure the sensing parameters accurately, other factors are needed to be isolated. However, prior art isolation methods need some improvement.

SUMMARY OF THE INVENTION

The present invention provides a multi-core fiber grating sensor. A length of an optical fiber according to the present invention comprises: first and second doped cores that extend along the length of the fiber; each of the cores having a different dopant regime; each of the cores including a grating having substantially the same grating period; and a cladding that surrounds the first and second cores.

A method of making an optical fiber according to the present invention comprises the steps of: doping a first core with a dopant regime; doping a second core with a different dopant regime from the first core; providing a cladding layer to cover the first and second cores; and provide a grating in each of the cores, which has substantially the same grating period.

A temperature sensor according to the present invention comprises: an optical fiber having at least first and second cores; each of the cores being doped and having a different dopant regime; each of the cores having a grating with substantially the same grating period, the gratings being adapted to reflect an incoming optical signal differently and the difference in reflected wavelengths from each of the gratings varies in accordance with a temperature in a surrounding environment; and a cladding layer to cover each of the cores.

An optical fiber according to the present invention comprises: N cores parallel to each of the cores; each of the cores being doped and having a different dopant regime; and each of the cores having a grating with substantially the same grating period, wherein the gratings are configured to measure N parameters.

BRIEF DESCRIPTION OF THE DRAWINGS

Referring now to the drawings.

DETAILED DESCRIPTION

Figure 1:
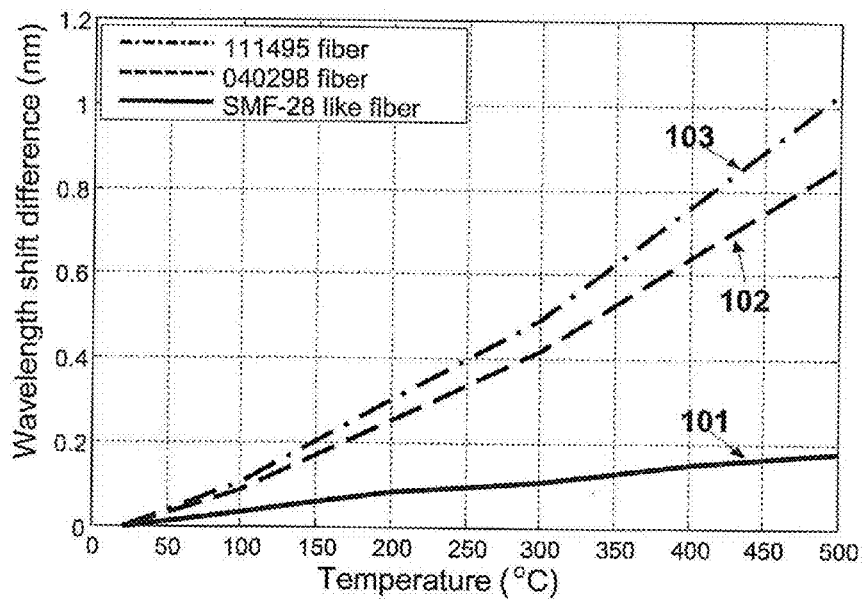
FIG. 1 shows the wavelength shifts of different types of gratings versus the temperature relative to a grating in an antimony (Sb)-doped fiber.

Multiplexing capability, small footprint and measurement robustness have made fiber Bragg grating based sensors very attractive in many measurement applications. In most of the fiber Bragg grating based sensors, a change in the Bragg grating wavelength correlates to a particular sensing parameter.

Both strain and temperature applied to a grating are known to cause a relatively large change in grating wavelength. Other factors that cause a change in the grating wavelength are the amount of hydrogen, deuterium, or any substance which can get into a core of an optical fiber and change the effective refractive index of its core; or an acoustic wave impinged on a grating in the fiber. To measure any particular sensing parameter accurately, it needs to be decoupled or isolated from other factors. Especially, if the sensing parameter is temperature or strain, decoupling of the strain and the temperature (i.e. isolate effect of temperature from strain or vise versa) is important.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications and equivalents.

Referring now to FIG. 1, the figure shows wavelength shifts of different types of gratings versus the temperature relative to a grating in a Sb-doped fiber. Those gratings were subjected to a temperature change of 23° C. to 500° C.

Four different fibers are tested: antimony (Sb)-doped fiber; SMF-28 like fiber 101; 040298 fiber 102; and 111495 fiber 103. The SMF-28 like fiber 101 is a low germanium (Ge) doped fiber similar to Corning SMF-28 fiber. The 040298 fiber 102 and the 111495 fiber 103 are OFS fibers with high Ge concentration and other doping. Each of the fibers also has a grating, which is substantially the same grating period to each other. However, those fibers have different dopant regimes. A "dopant regime" refers to the particular dopant or dopant concentrations used to modify the refractive index of an optical fiber or portion thereof. FIG. 1 is plotted relative to Sb-doped fiber grating (i.e. (wavelength shift in the 111495 fiber, the 040298 fiber or the SMF-28 like fiber grating)—(wavelength shift in Sb-doped fiber grating)). The Sb-doped fiber has lower wavelength shift versus temperature when compared with the SMF-28 like fiber.

Figure 2:
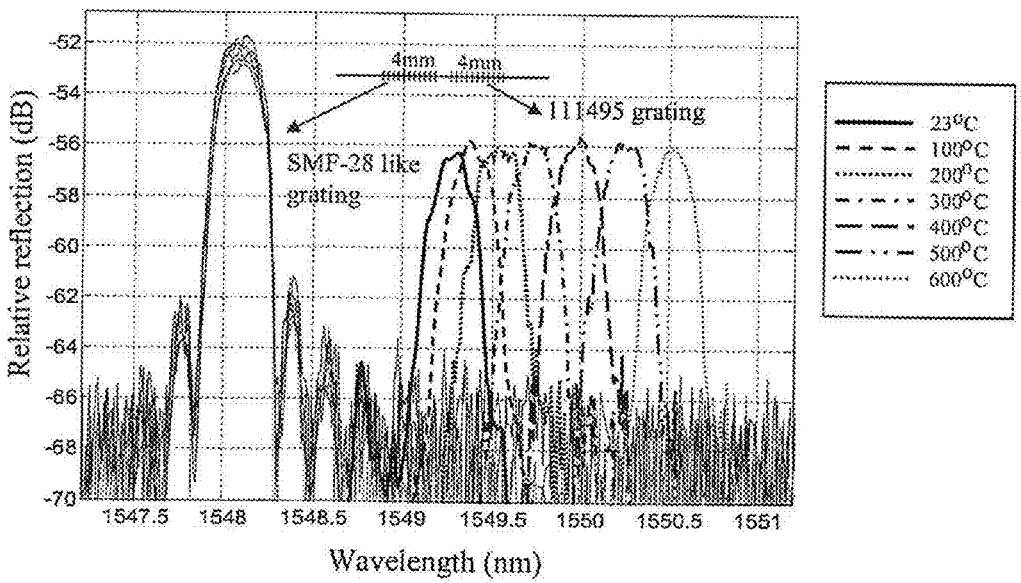
FIG. 2 shows spectra of the wavelength separation changes versus temperature for different types of gratings.

Referring now to FIG. 2, the figure shows the spectra of wavelength separation change versus temperature for the gratings in the 111495 fiber 103 and the SMF-28 like fiber 101. The test was conducted by splicing these two fibers (i.e. the 111495 and the SMF-28 like fibers) with gratings together and subjecting them to the same temperature. As can be seen from FIG. 2, the wavelengths of the 111495 fiber 103 shift to the longer wavelength as the temperature increases. However, compared to the 111495 fiber 103, the wavelength for the SMF-28 like fiber 101 remained relatively unchanged as the temperature increases. Therefore, the wavelength separation (i.e. difference in the wavelengths) between the grating on the 111495 fiber 103 and the grating on the SMF-28 like fiber 101 increases as the temperature increases. This shows that the gratings in these two fibers have different thermal characteristics.

Figure 3:
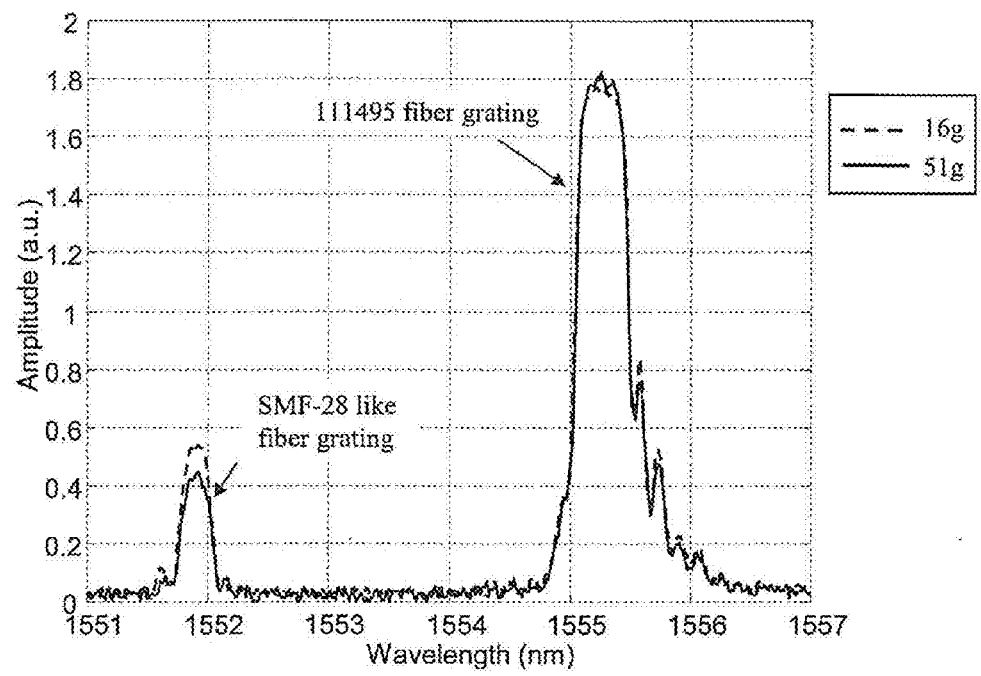
FIG. 3 shows the effect of strain in different types of gratings.

Referring now to FIG. 3, the figure shows the effect of strain in the gratings on the 111495 fiber 103 and the SMF-28 like fiber 101. The figure compared two tension states (16 g and 51 g) and matched the low wavelength grating spectrum. As shown in this figure, there is almost no wavelength separation change between 16 g (dotted line) and 51 g (solid line) tension states. This shows that the gratings in these two fibers have substantially the same strain characteristics.

When an optical fiber with a grating is subject to an external disturbance, the effective index of the core may change, and thus, the wavelength of light reflected by the grating shifts from its original wavelength. Disturbances, such as strain and temperature, applied to the grating, are known to cause larger shifts in the reflected light wavelength. The respective shifts in the reflected light wavelength due to the change of strain, $\Delta\epsilon$, and due to the change of temperature, $\Delta T$, can be expressed as the following mathematical equations, respectively:

$$\Delta\lambda_\epsilon = K_\epsilon \Delta\epsilon \quad (1)$$

$$\Delta\lambda_T = K_T \Delta T \quad (2)$$

Where $\Delta\lambda_\epsilon$ is the change in the reflected light wavelength due to the change of strain, where $\Delta\lambda_T$ is the change in the reflected light wavelength due to the change of temperature, and where $K_\epsilon$ and $K_T$ are coefficients relating to the rate of change of the strain and the temperature respectively, in accordance with the shift in the wavelength of light reflected by the grating. In this specification, parameters, such as $\Delta\epsilon$ and $\Delta T$, which are chosen to be measured, are referred to as "predetermined target parameters."

If a cumulative change in the reflected light wavelength from a grating is expressed as $\Delta\lambda_G$, then equations 1 and 2 can be combined as follows:

$$\Delta\lambda_G = K_\epsilon \Delta\epsilon + K_T \Delta T \quad (3)$$

Figure 4:
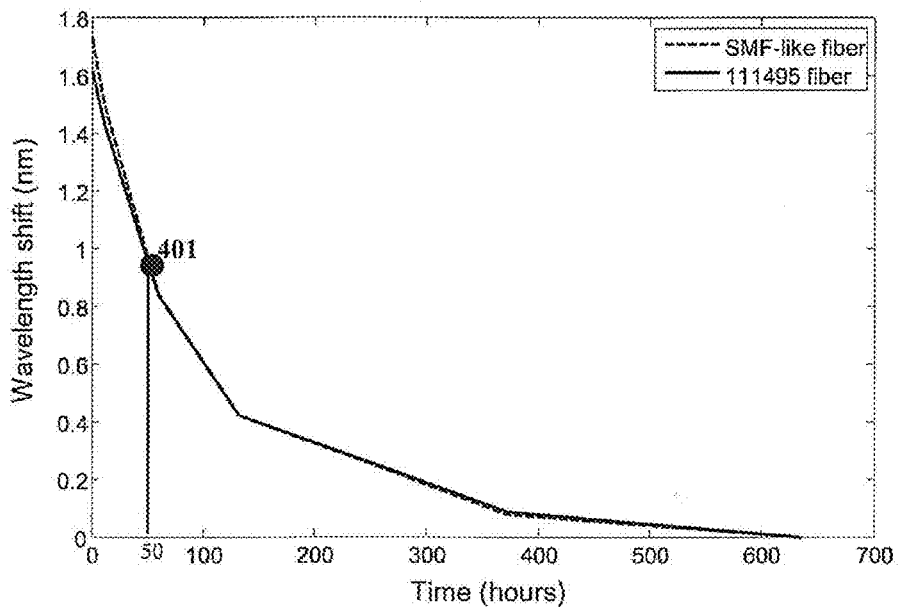
FIG. 4 shows the effect of deuterium on wavelength shifts for different types of gratings.

Besides the temperature and the strain, hydrogen and/or deuterium effects shift the reflected light wavelength as well. FIG. 4 shows the effect of deuterium on wavelength shift for different types of gratings. This figure shows the wavelength shifts for the gratings on the 111495 fiber 103 (solid line) and the SMF-28 like fiber 101 (dotted line) after the gratings were pulled out of deuterium loading and left in the room temperature air. The gratings were loaded with deuterium at 4400 psi and 50° C. for 3.9 days.

The result shows that after those gratings are left at room temperature for ~50 hours (see dot 401), the relative wavelength shifts between the gratings on the 111495 fiber 103 and the SMF-28 like fiber 101 are substantially zero, which is the same status as they were prior to deuterium loading. This means that there is substantially no wavelength separation change for these two gratings that is attributable to deuterium concentration in the fibers. Since deuterium and hydrogen have similar chemical characteristics. (deuterium has one extra neutron in its core), it is reasonable to predict that even if hydrogen is loaded onto such fiber (and/or its core), there would be substantially no wavelength separation change due to the hydrogen concentration in the fiber.

In order to decouple the values of predetermined target parameters or measure the value of a predetermined target parameter independent from the effects from other factors, in one of the embodiments of the present invention, a twin-core fiber configuration was chosen.

In the embodiments, the twin-core fiber is made such that the gratings in both cores experience the same strain and temperature changes. If equation (3) is applied to each grating, the following equations are obtained:

$$\Delta\lambda_{G1} = K_{\epsilon 1}\Delta\epsilon + K_{T1}\Delta T \quad (4a)$$

$$\Delta\lambda_{G2} = K_{\epsilon 2}\Delta\epsilon + K_{T2}\Delta T \quad (4b)$$

Where $\Delta\lambda_{G1}$ and $\Delta\lambda_{G2}$ are changes in the reflected light wavelength by the first core and the second core, respectively, and $K_{\epsilon 1}$ and $K_{T1}$ are coefficients relating to the rate of change of the strain and the temperature in the first core, respectively, and $K_{\epsilon 2}$ and $K_{T2}$ are coefficients relating to the rate of change of the strain and the temperature in the second core, respectively.

The two cores are chosen such that the matrix related to the grating coefficients, $$\begin{bmatrix} K_{\epsilon 1} & K_{T1} \\ K_{\epsilon 2} & K_{T2} \end{bmatrix},$$

is well conditioned. Thus, equation (5) can be performed to obtain the predetermined target parameters, $\Delta\epsilon$ and $\Delta T$ $$\begin{bmatrix} \Delta\epsilon \\ \Delta T \end{bmatrix} = \begin{bmatrix} K_{\epsilon 1} & K_{T1} \\ K_{\epsilon 2} & K_{T2} \end{bmatrix}^{-1} \begin{bmatrix} \Delta\lambda_{G1} \\ \Delta\lambda_{G2} \end{bmatrix} \quad (5)$$

In this case, the two predetermined target parameters, $\Delta\epsilon$ and $\Delta T$, are decoupled and obtained.

If the change of temperature is the only interest, equations (4a) and (4b) can be combined to obtain:

$$\Delta\lambda_{G12} = K_{\epsilon 1}\Delta\epsilon + K_{T1}\Delta T - K_{\epsilon 2}\Delta\epsilon - K_{T2}\Delta T \quad (6)$$

or $$\Delta\lambda_{G12} = (K_{\epsilon 1} - K_{\epsilon 2})\Delta\epsilon + (K_{T1} - K_{T2})\Delta T \quad (7)$$

Where $\Delta\lambda_{G12}=\Delta\lambda_{G1}-\Delta\lambda_{G2}$ is the difference in the wavelength change between these two gratings.

In embodiments of the present invention, these gratings are configured such that the strain coefficients of those gratins are substantially the same (i.e. $K_{\epsilon 1} \approx K_{\epsilon 2}$) Therefore, the equation (7) can be simplified as follows:

$$\Delta\lambda_{G12} \approx (K_{T1}-K_{T2})\Delta T \qquad (8)$$

or $$\Delta T \approx \Delta\lambda_{G12}/(K_{T1}-K_{T2}) \qquad (9)$$

Equation (9) states that the difference in the wavelength change between these two gratings due to the strain and temperature can directly result in the temperature change measurement. Therefore, it simplifies further data analysis.

Furthermore, in embodiments of the present invention, these two gratings are configured such that the wavelength changes due to the deuterium (or hydrogen) concentration change are substantially the same. Thus, equation (9) can still be used to obtain the temperature change measurement when such three parameters co-exist (e.g. in high humidity environment).

Figure 5:
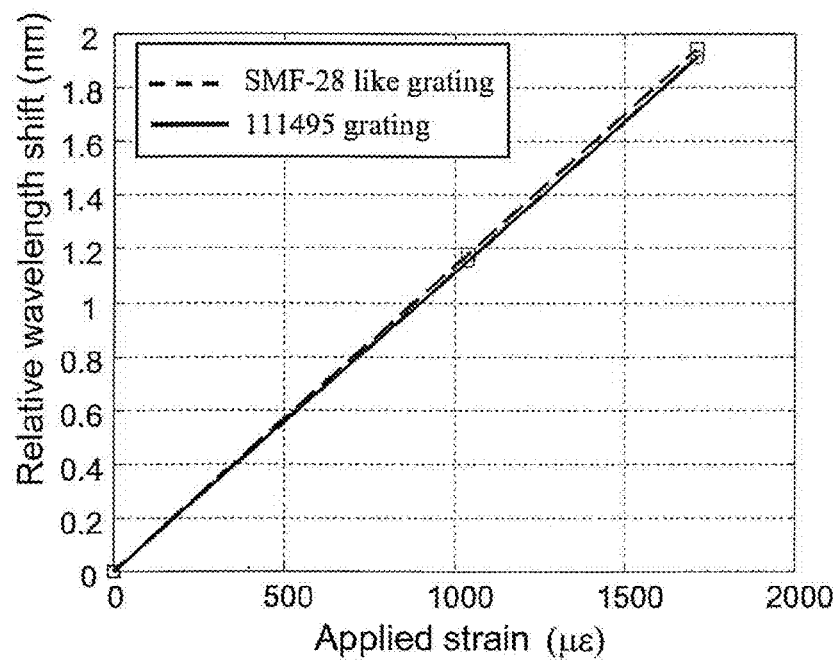
FIG. 5 shows the wavelength shifts in different types of gratings by strain.

The above results show that by combining two different fibers in a twin-core fiber, a grating-based sensor capable of decoupling the strain and the temperature or isolating the temperature measurement from other factors can be constructed. As an embodiment of the present invention, a core of the SMF-28 like fiber and a core of the 111495 fiber are combined to create a twin-core fiber. According to FIGS. 2 and 3, the gratings in those two fibers (and those cores) have different temperature coefficients (i.e. the wavelength separation between these two gratings increases as temperature increases), and substantially the same strain coefficients (i.e. substantially no wavelength separation change occurs between these two gratings when applied strain changes). More specifically, FIG. 5 shows relative wavelength shifts in the 111495 and the SMF-28 like fiber gratings by strain. From the figure, the strain coefficients are calculated to be 1.114 pm/με and 1.092 pm/με for the SMF-28 like and the 111495 fiber gratings, respectively. The calculation result shows that these two coefficients are substantially the same.

Figure 6:
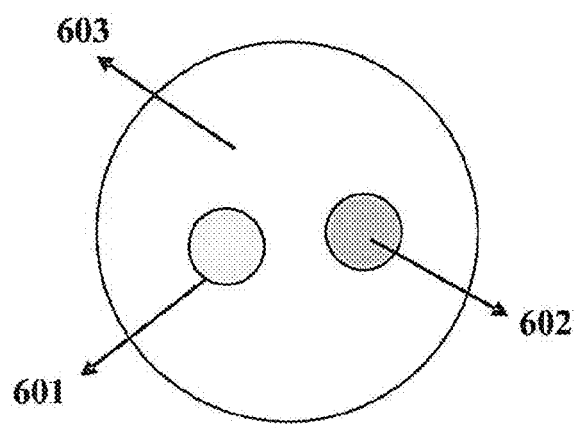
FIG. 6 shows the cross section of a twin-core fiber as an embodiment of the present invention.

FIG. 6 shows the cross section of a twin-core fiber in an embodiment of the present invention. A first core 601 and a second core 602 are covered by a cladding 603. Each of the cores 601 and 602 has a different dopant regime, which causes that grating in each core to reflect an incoming wavelength differently. The grating in each core has the same period; however, because there are different dopant regimes in each core, reflected wavelengths from the gratings are different. The reflected wavelengths may be different for different predetermined target parameters. The predetermined target parameter is a parameter which is to be measured using the twin-core fiber described in the present invention. Some examples of predetermined target parameters are temperature, strain, hydrogen (deuterium) concentration, any substance which can get into the fiber core(s) and change the effective index of the core, or an acoustic wave impinged on the grating(s). In a high humidity environment (i.e. high hydrogen environment), the difference in reflected wavelengths from both of the cores are unaffected by hydrogen diffusing into the fiber since both of the cores are unaffected by hydrogen concentration as shown in FIG. 4.

As for the dopant regimes, in one embodiment of the present invention, different concentrations of the same dopant are used. For example, germanium can be used as a dopant for each of the cores The first core can be doped such that the difference in the refractive indexes between the first core and the cladding is approximately between 0.004 and 0.008. The second core can be doped such that the difference in refractive indexes between the second core and the cladding is approximately between 0.035 and 0.05.

Alternatively, the two cores may comprise with different dopants from one another. For example, the first core may be doped with antimony in such a way that the difference in the refractive indexes between the first core and the cladding is approximately between 0.004 and 0.008. The second core can be doped with geranium in such a way that the difference in the refractive indexes between the second core and the cladding is approximately between 0.035 and 0.05.

Also, each of the cores is so placed that cores are far enough apart that light transmitted from a coupler to each of the cores does not exchange between the cores and, at the same time, are close enough that a coupling region can transmit light to each of the cores simultaneously, for example, using a fiber tapering technique. It is known that a low-index trench outside of the core reduces the spatial spreading of optical power. A low-index layer more than 1 μm thick with an index between −0.001 DN and −0.025 DN may be placed between the cores to reduce inter-core coupling. This barrier layer also permits more compact placement of the cores within the twin-core fiber."

In the embodiments of the invention, the diameter of the second core is chosen to be approximately between 2 μm and 3 μm, the diameter of the first core is chosen to be approximately 8 μm, and the diameter of the cladding is chosen to be at least 20 μm.

Figure 7:
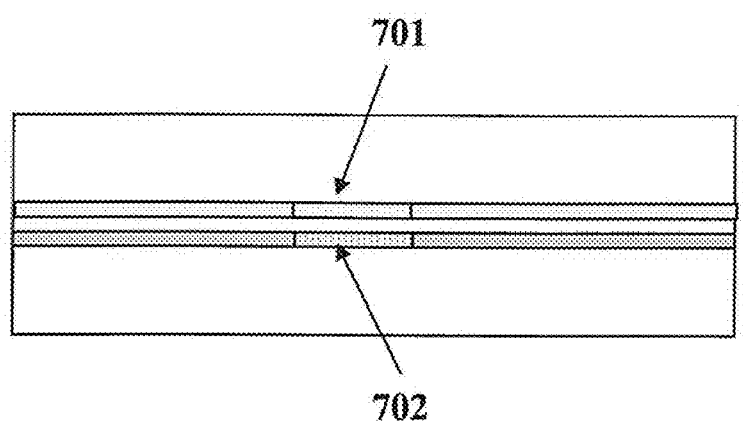
FIG. 7 shows the preferred location of the gratings in the twin-core fiber.

In some of the embodiments, the grating can be inscribed into these two cores simultaneously, and the resulting preferred location of the gratings 701 and 702 is schematically shown in FIG. 7.

In the embodiments of the invention, an incoming optical signal is a broadband source and the wavelength range of the incoming optical signal is approximately from 1520 to 1620 nm.

The twin-core configuration can be also applied to more than two cores (i.e. multi-core) configuration. For example, an optical fiber comprising N cores parallel to each of the cores can be constructed. The cores have different dopant regimes. A grating with substantially the same grating period applied to each of the cores. The fiber with N cores described above can be configured to measure up to N parameters. The N parameters can be temperature, strain, hydrogen concentration, or any predetermined target parameters. For example, if two cores are selected (i.e. N=2), then temperature and strain may be chosen as the predetermined target parameters. Or, if three cores are selected (i.e. N=3), then temperature, strain and hydrogen loading may be chosen as the predetermined target parameters. For example with the SMF-28 like, the I 1495 and the 40298 fibers, all three fibers have substantially the same strain coefficients. The SMF-28 like and the 111495 fibers have almost the same deuterium (or hydrogen) coefficients, but the 40298 fiber has a slightly different deuterium (or hydrogen) coefficient. The thermal coefficients of those fibers are all different. If a triple-core fiber is constructed, the fiber is capable of measuring the temperature, the strain, and the deuterium (or hydrogen) concentration.

Since each of the N cores has a unique coefficient for the N predetermined target parameters, the N parameters are measured from a well-constructed matrix.

Since each of the N cores, has unique coefficients for the (N-A) predetermined target parameters, the parameters are measured from a well-constructed matrix and the extra measurements value(s) A are used for data redundancy to improve measurement accuracy.

Figure 8:
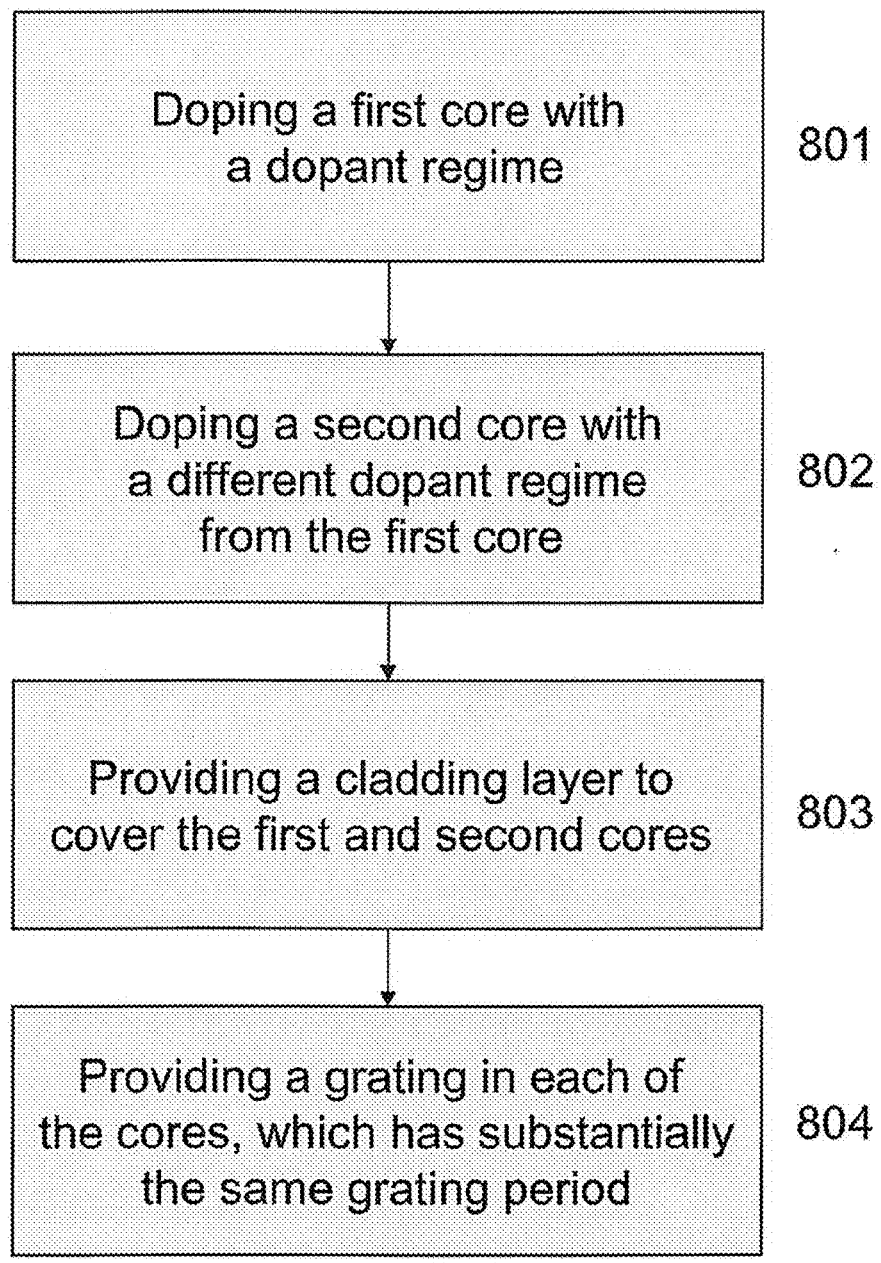
FIG. 8 shows a flow chart for a twin-core fiber manufacturing method according to the present invention.

FIG. 8 is a flow chart depicting a method of creating a twin-core fiber in accordance with an embodiment of the present invention. As seen in this figure, the method begins with doping a first core with a dopant regime in step 801.

In step 802, a second core is doped with a different dopant regime from the first core. This step maybe performed simultaneously with the previous step. Each of the cores is doped with a dopant regime according to the predetermined target parameters for sensor applications. For those two steps, each core may be fabricated by using modified chemical vapor deposition (MCVD) method or other well-known optical fiber fabrication methods.

Then, in step 803, a cladding layer is provided to cover the first and the second cores. For example, the cladding layer can be provided by drilling two holes on a glass rod, placing these two cores in the holes, and then collapsing the whole assembly to make a preform for the twin-core fiber. The twin-core fiber can be drawn from the preform in a regular fiber draw tower.

Next, the fiber can be loaded with deuterium or hydrogen to increase photosensitivity for grating writing, and then a grating is inscribed in each of the cores in step 804 by using well-known interferometric or phase-mask techniques. The periods of the gratings in both of the cores are the same because the gratings are written with the same mask or interferometric pattern. The gratings in the two cores are then stabilized by annealing at a higher temperature than the maximum measurement temperature. In the preferred embodiment of the present invention, the grating in each of the cores is made simultaneously at the same longitudinal location as shown in FIG. 7.

One of the applications to use the twin-core fibers (or any multi-core fiber) in the present invention is as a temperature sensor. For this application, a twin-core fiber with two gratings, which have substantially the same strain coefficients but large difference in thermal coefficients, was manufactured.

Figure 9:
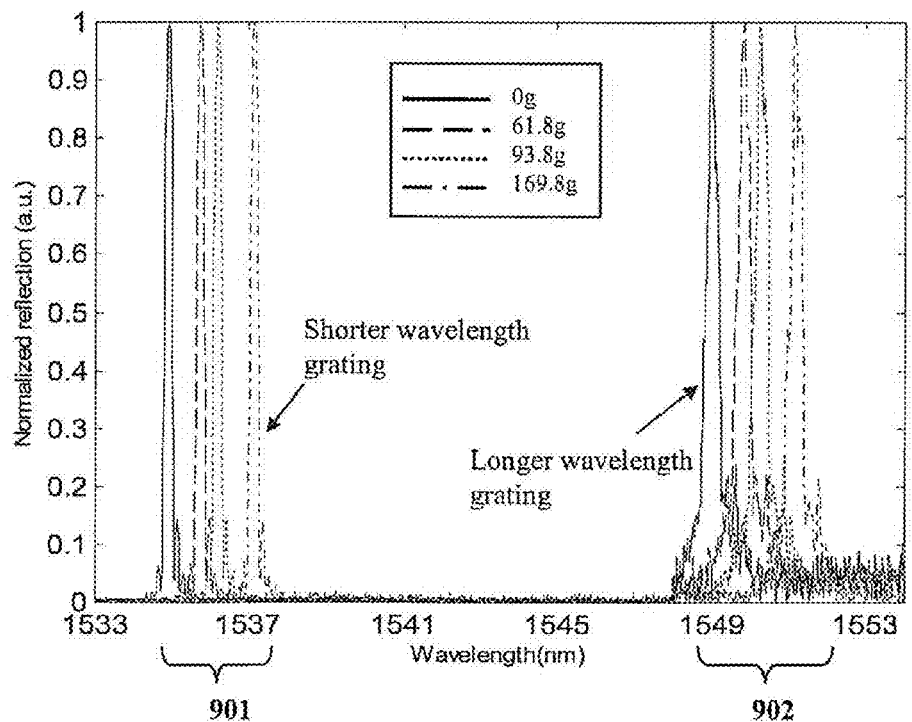
FIG. 9 shows the wavelength shifts of two gratings at different tensions.
Figure 10:
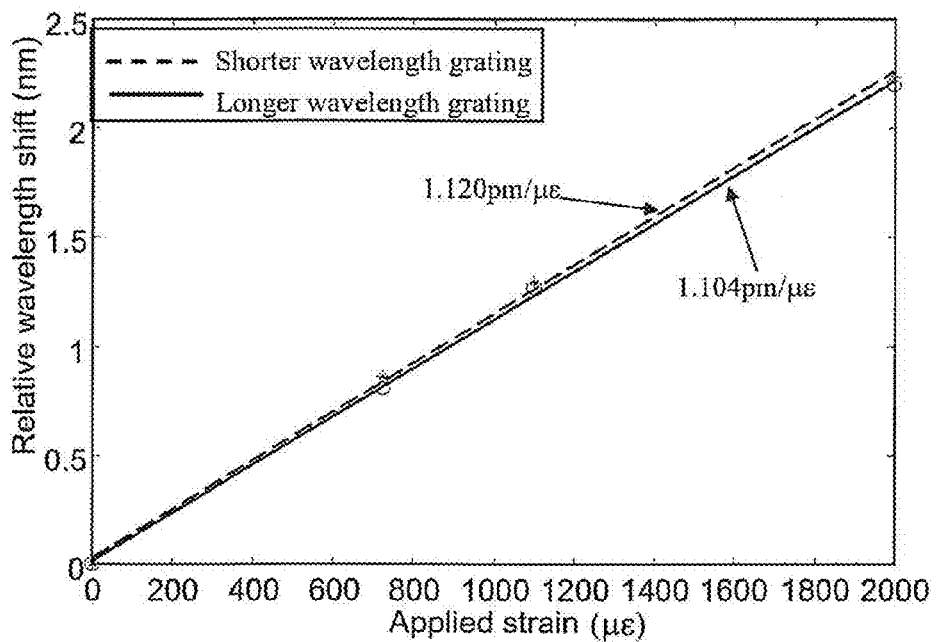
FIG. 10 shows strain coefficients of two gratings.

FIG. 9 shows the wavelength shift of the two gratings under the same tension (i.e. strain). As shown in FIG. 9, when the twin-core fiber was subjected to the same tension, reflections from those two gratings (i.e. a shorter wavelength grating 901 and a longer wavelength grating 902) shift by approximately the same amount for a given tension. By using the equations above, the strain coefficients of those two gratings are calculated to be 1.120 pm/µε for the shorter wavelength grating 901 and 1.104 pm/µε for the longer wavelength grating 902. FIG. 10 shows the graphical representation of the strain coefficients of those two gratings. As shown in FIG. 10, relative wavelength shifts of those gratings are substantially the same for given applied strains.

Figure 11:
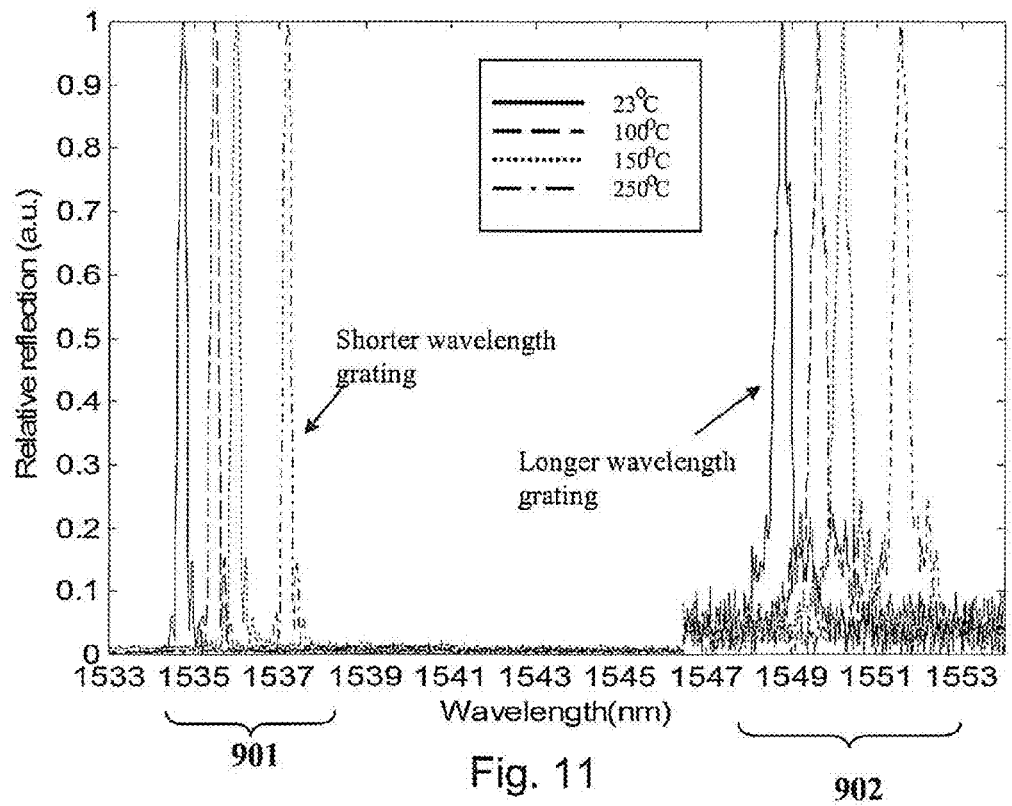
FIG. 11 shows wavelength shifts of two gratings at different temperatures.

A similar analysis was done based on temperature. FIG. 11 shows the wavelength shift of the two gratings at the same temperature. As shown in FIG. 11, when the twin-core fiber was subjected to the same temperature, reflections from those two gratings (i.e. a shorter wavelength grating 901 and a longer wavelength grating 902) shift by different amount at a given temperature. By using the equations above and a second order polynomial fit, the wavelength shifts of those two gratings are calculated to be:

$$\Delta\lambda_{G\_shorter} = 8.001 \times 10^{-6} \Delta T^2 + 8.946 \times 10^{-3} \Delta T + 3.748 \times 10^{-4} \quad (10)$$

$$\Delta\lambda_{G\_longer} = 9.442 \times 10^{-6} \Delta T^2 + 9.977 \times 10^{-3} \Delta T + 1.664 \times 10^{-3} \quad (11)$$

Figure 12:
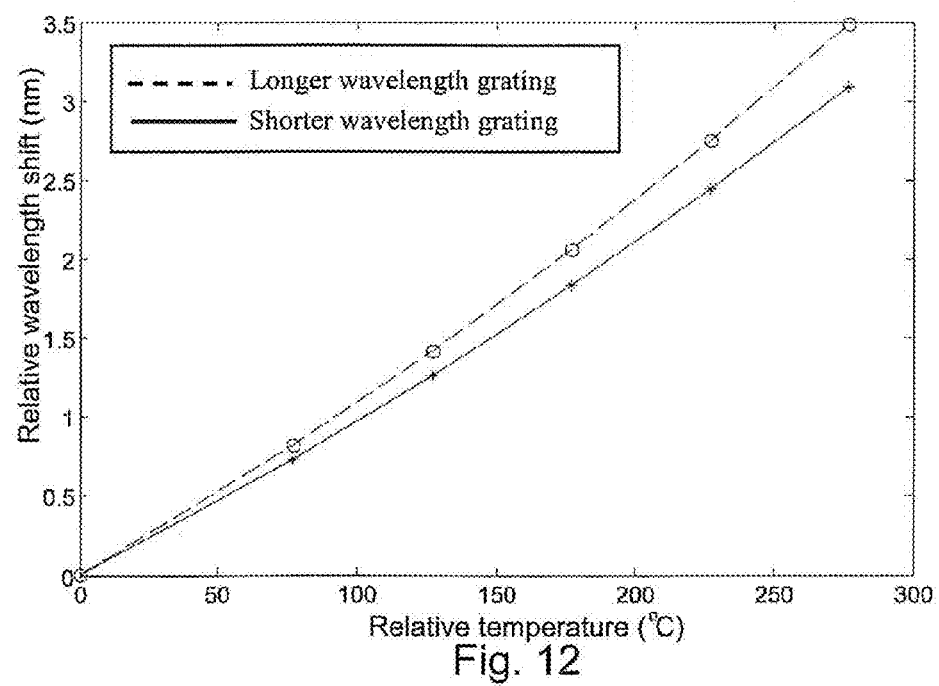
FIG. 12 shows another view of wavelength shifts of two gratings at different temperatures.

$\Delta\lambda_{G\_shorter}$ in nm is the equation for the shorter wavelength grating 901, $\Delta\lambda_{G\_longer}$ in nm is the equation for the longer wavelength grating 902, and $\Delta T$ is the change in temperature in °C. FIG. 12 shows a graphical representation of equations 10 and 11 above. As shown in FIGS. 11 and 12, the relative wavelength shifts of those gratings due to temperature are substantially different for a given temperature.

Figure 13:
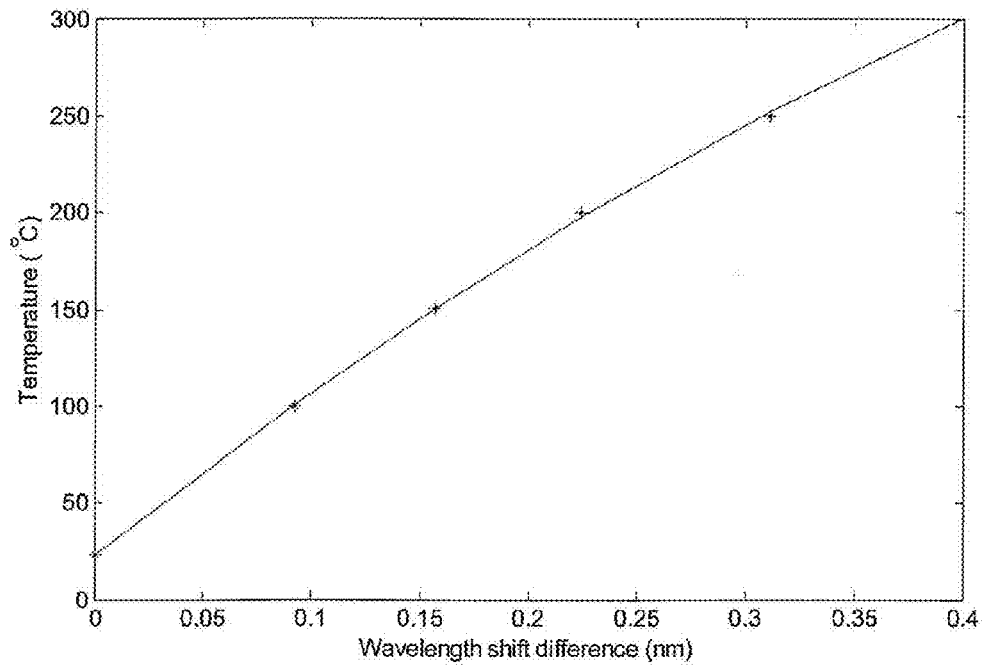
FIG. 13 shows temperature as a function of the change in wavelength separation between the two gratings in the twin-core fiber.

Thus, the grating sensor can achieve the separation of the strain and the temperature with improved measurement accuracy. FIG. 13 shows the temperature as a function of the change in the wavelength separation between the two gratings in the twin-core fiber. Since the strain coefficients are substantially the same, the change in wavelength separation between these two gratings can be used to simplify the temperature calculation. In this particular embodiment, the following relationship between the difference in the wavelength shift between the two gratings and temperature is found to be:

$$T = 106.9\Delta\lambda^3 - 554.5\Delta\lambda^2 + 899.2\Delta\lambda + 22.69 \quad (12)$$

Where T is the temperature in °C., and $\Delta\lambda$ is the difference in the wavelength shift in nm between the two gratings (i.e. $\Delta\lambda_{G\_longer} - \Delta\lambda_{G\_shorter}$).

Figure 14:
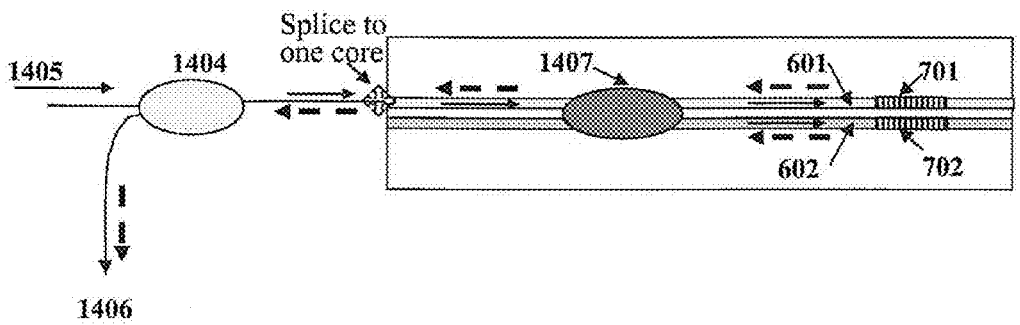
FIG. 14 shows an exemplary twin-core fiber grating sensor measurement apparatus.

The above twin-core fiber can be installed in a fiber grating sensor measurement apparatus. FIG. 14 shows an exemplary twin-core fiber grating sensor measurement apparatus. To couple a light source into both of the cores 601 and 602 and to obtain the reflections back from both of the cores 601 and 602, a section of twin-core fiber includes a 3 dB coupler type structure designated as coupling region 1407. The solid arrows in the figure represent the launching light, and the dotted arrows represent the light reflected by the gratings 701 and 702. One of the cores (either 601 or 602) is spliced to one leg of a commercial 2×2 3 dB coupler 1404 and the other legs in the other side of the 3 dB coupler 1404 are connected to a light source 1405 and an OSA or interrogator 1406. The light source 1405 is a single broadband source which range approximately from 1520 nm to 1620 nm.

While various embodiments of the present invention have been described above, it should be understood that they have been presented by way of example, and are not intended to limit the applications of the present invention. It will be apparent to persons skilled in the relevant art that various changes in form and detail may be made therein without departing from the spirit and scope of the invention. Thus, the present invention should not be limited by any of the above-described embodiments, but should be defined only in accordance with the following claims and their equivalents.

What is claimed is:

1. A length of an optical fiber, suitable for measuring temperature in an environment containing hydrogen, comprising:
   first and second doped cores that extend along the length of the fiber;
   each of the cores having a different dopant regime;
   each of the cores including a grating having substantially the same grating period;
   the dopant regimes being selected to render the wavelengths, reflected by the gratings, substantially unaffected by strain experienced by each core and the surrounding hydrogen environment; and
   a cladding that surrounds the first and second cores,
   wherein the surrounding temperature is measured based on the difference in reflected wavelengths from the gratings.

2. The optical fiber of claim 1, wherein different concentrations of the same dopant are used in the first and second cores.

3. The optical fiber of claim 2, wherein the dopant for each of the cores is germanium, and the first core is doped such that the difference in refractive index between the first core and the cladding is approximately between 0.004 and 0.008, and the second core is doped such that the difference in refractive index between the second core and the cladding is approximately between 0.035 and 0.05.

4. The optical fiber of claim 1, wherein each of the cores is so placed such that light transmitted from a coupler to each of the cores does not exchange between the cores and the light transmits to each of the cores simultaneously.

5. The optical fiber of claim 1, wherein at least one low index trench is placed between the Cores, wherein the refractive index of the low index trench is approximately between −0.001 DN and −0.025 DN.

6. The optical fiber of claim 1, wherein the diameter of the second core is approximately between 2 μm to 3 μm, the diameter of the first core is approximately 8 μm, and the diameter of the cladding is approximately at least 20 μm.

7. The optical fiber of claim 1, wherein the different dopants are used in the first and second cores.

8. The optical fiber of claim 7, wherein the dopant for the first core is antimony, the first core is doped such that the difference in refractive index between the first core and the cladding is approximately between 0.004 and 0,008, and the dopant for the second core is germanium, the second core is doped such that the difference in refractive index between the second core and the cladding is approximately between 0.035 and 0,05.

9. The optical fiber of claim 1, wherein the gratings reflect an incoming optical signal, and the incoming optical signal is a single broadband source.

10. The optical fiber of claim 9, wherein the wavelength range of the incoming optical signal is approximately from 1520 nm to 1620 nm.

11. A method of making an optical fiber, suitable for measuring temperature in an environment containing hydrogen, comprising the steps of:
    doping a first core with a dopant regime;
    doping a second core with a different dopant regime from the first core;
    providing a cladding layer to cover the first and second cores; and
    providing a grating in each of the cores, which has substantially the same grating period,
wherein the dopant regimes being selected to render the wavelengths, reflected by the gratings, substantially unaffected by strain experienced by each core and the surrounding hydrogen environment, and the surrounding temperature is measured based on the difference in reflected wavelengths from the gratings.

12. The method of claim 11, wherein the dopant regimes are selected to modify grating coefficients such that a strain coefficient, $K_\epsilon$, and a hydrogen coefficient, $K_g$, of the gratings in the first and second cores are substantially the same.

13. The method of claim 11, wherein grating in each of the cores is provided simultaneously at the same longitudinal location.

14. A temperature sensor, suitable for an environment containing hydrogen, comprising:
    an optical fiber having at least first and second cores;
    each of the cores being doped and having a different dopant regime;
    each of the cores having a grating with substantially the same grating period;
    the dopant regimes being selected to render the wavelengths, reflected by the gratings, substantially unaffected by strain experienced by each core and the surrounding hydrogen environment; and
    a cladding layer to cover each of the cores,
wherein surrounding temperature is measured based on the difference in reflected wavelengths from the gratings.

15. The temperature sensor in claim 14, further comprising a coupling region to couple the first and the second cores prior to the gratings, the coupling region is configured to decouple the incoming optical signal to each of the cores and couples the reflected wavelengths from the each of the gratings.

16. The temperature sensor in claim 15, further comprising a source of the incoming optical signal and an interrogator, which are optically connected to one of the cores or a coupler.

17. The temperature sensor in claim 14, wherein the incoming optical signal is a broadband source and its wavelength range is approximately from 1520 nm to 1620 nm.

18. An optical fiber, suitable for measuring temperature in an environment containing hydrogen, comprising:
    N cores parallel to each of the cores;
    each of the cores being doped and having a different dopant regime;
    each of the cores having a grating with substantially the same grating period; and
    the dopant regimes being selected to create the well-conditioned grating coefficient matrix, which is capable of measuring up-to N parameters based on the reflected wavelengths from the gratings,
wherein N is three or more, and one of the N parameters is the hydrogen effect.

19. The optical fiber of claim 18, wherein the N cores are first, second and third cores and the N parameters are temperature, strain and hydrogen.

20. The optical fiber of claim 18, wherein the grating matrix is configured to measure (N-A) parameters, where an extra measurement value A provides data redundancy.

* * * * *